United States Patent
Colantonio et al.

(10) Patent No.: US 8,424,447 B2
(45) Date of Patent: Apr. 23, 2013

(54) CAPSULE WITH FLOW REGULATING TECHNOLOGY

(75) Inventors: Jean-Luc Colantonio, Estavayer-le-lac (CH); Christian Jarisch, Paudex (CH); Jean-Paul Denisart, La Conversion (CH)

(73) Assignee: Nestec S.A., Vevey (CH)

( * ) Notice: Subject to any disclaimer, the term of this patent is extended or adjusted under 35 U.S.C. 154(b) by 704 days.

(21) Appl. No.: 12/532,114

(22) PCT Filed: Mar. 17, 2008

(86) PCT No.: PCT/EP2008/053148
§ 371 (c)(1),
(2), (4) Date: Jan. 25, 2010

(87) PCT Pub. No.: WO2008/113779
PCT Pub. Date: Sep. 25, 2008

(65) Prior Publication Data
US 2010/0147156 A1 Jun. 17, 2010

(30) Foreign Application Priority Data
Mar. 19, 2007 (EP) .................................... 07104397

(51) Int. Cl.
*A47J 31/44* (2006.01)
*A47J 31/06* (2006.01)
*B65B 29/02* (2006.01)

(52) U.S. Cl.
USPC ................. 99/295; 99/302 R; 99/323; 426/79; 426/80

(58) Field of Classification Search .................... 99/295, 99/302 R, 323, 494, 532, 533; 426/79, 77, 426/80; 604/236, 238, 213, 215, 218
See application file for complete search history.

(56) References Cited

U.S. PATENT DOCUMENTS
| | | | |
|---|---|---|---|
| 4,446,158 A | 5/1984 | English et al. | 426/79 |
| 6,354,190 B1 * | 3/2002 | Haydon | 99/323 |

(Continued)

FOREIGN PATENT DOCUMENTS
| | | |
|---|---|---|
| EP | 0 615 921 | 9/1994 |
| EP | 870 457 | 10/1998 |
| EP | 1 440 907 | 7/2004 |
| EP | 1 767 467 B1 | 4/2009 |
| GB | 939 813 | 10/1963 |
| GB | 1256247 | 12/1971 |
| WO | WO 94/01344 | 1/1994 |

(Continued)

OTHER PUBLICATIONS
International Search Report, PCT/EP2008/053148, mailed Mar. 25, 2009.

(Continued)

*Primary Examiner* — Reginald L Alexander
(74) *Attorney, Agent, or Firm* — Winston & Strawn LLP

(57) ABSTRACT

A capsule comprising beverage ingredients therein, and including a closed enclosure hermetically sealed to gas; and a perforated flow-regulating disc member which is arranged in the closed enclosure, perpendicularly to the liquid flow path inside the capsule, and which is configured for separating the ingredients at least partially into at least two ingredient spaces and which enables liquid to spread more evenly and transversely across one ingredient space and to the periphery of the enclosure to facilitate extraction of the beverage ingredients in the ingredient spaces. The capsule also may include an insert located within the enclosure and having tubular portions which are respectively open away from the center of the enclosure, wherein the insert is centrally arranged inside the capsule, and the ingredients are entirely provided radially outside the tubular portions of the insert.

15 Claims, 10 Drawing Sheets

U.S. PATENT DOCUMENTS

| | | | |
|---|---|---|---|
| 6,485,766 B2 * | 11/2002 | Herod | 426/78 |
| 6,740,345 B2 * | 5/2004 | Cai | 426/77 |
| 7,854,192 B2 * | 12/2010 | Denisart et al. | 99/295 |
| 7,878,108 B2 * | 2/2011 | Mock et al. | 99/295 |
| 7,891,286 B2 * | 2/2011 | Scarchilli et al. | 99/295 |
| 7,946,217 B2 * | 5/2011 | Favre et al. | 99/295 |
| 8,220,382 B2 * | 7/2012 | Verbeek | 99/295 |
| 2003/0005826 A1 | 1/2003 | Sargent et al. | 99/279 |
| 2003/0172813 A1 | 9/2003 | Schifferle | 99/275 |
| 2005/0150390 A1 * | 7/2005 | Schifferle | 99/295 |
| 2007/0144355 A1 | 6/2007 | Desisart et al. | 99/275 |
| 2009/0004335 A1 * | 1/2009 | MacMahon et al. | 426/78 |

FOREIGN PATENT DOCUMENTS

| | | |
|---|---|---|
| WO | WO 94/02059 | 2/1994 |
| WO | WO 2005/020769 A1 | 3/2005 |
| WO | WO 2006/021405 | 3/2006 |
| WO | WO 2006/043096 | 4/2006 |

OTHER PUBLICATIONS

European Search Report, EP 07104397.0 mailed Aug. 22, 2008.

* cited by examiner

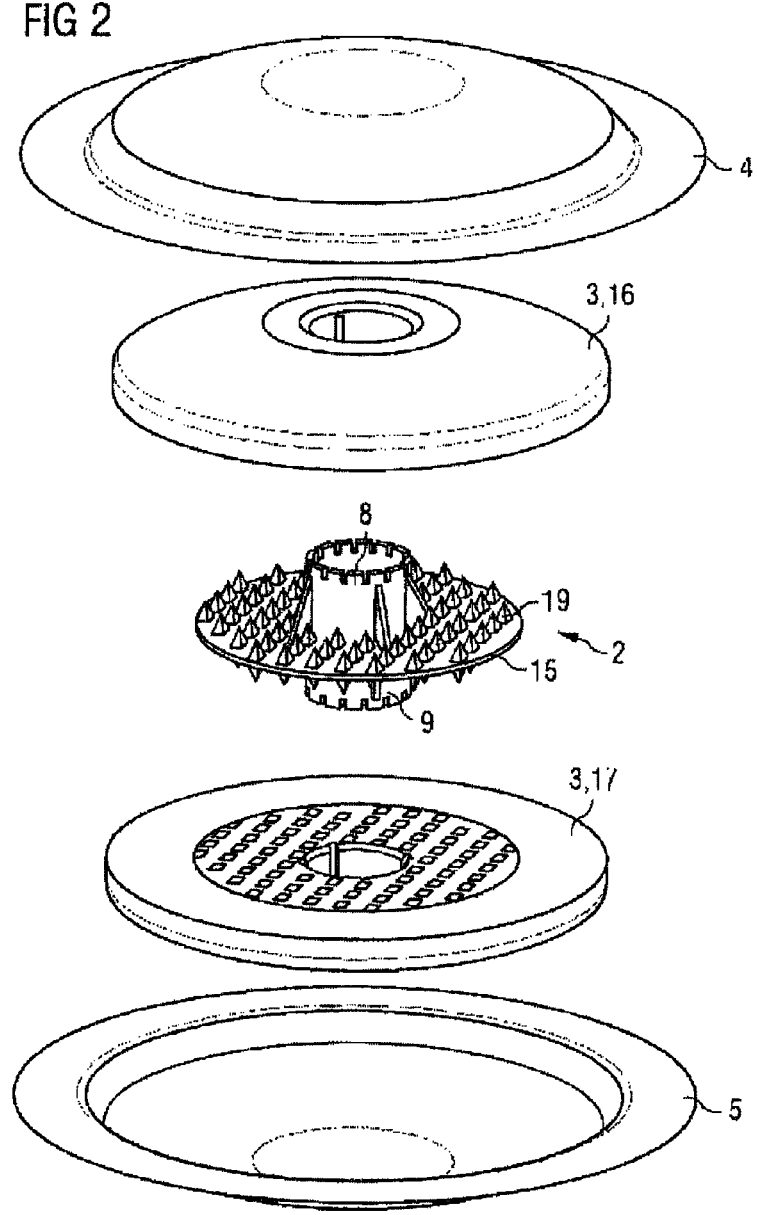

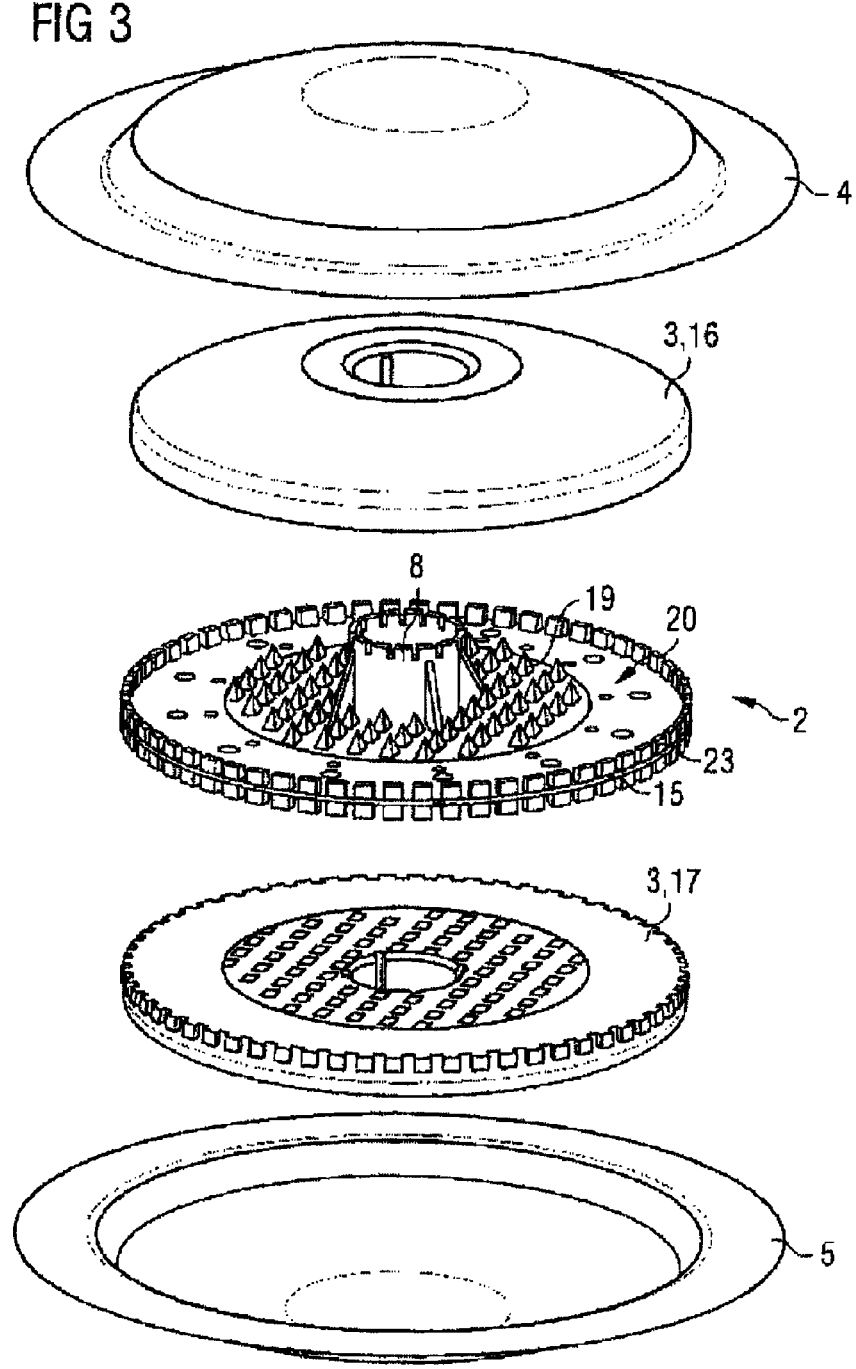

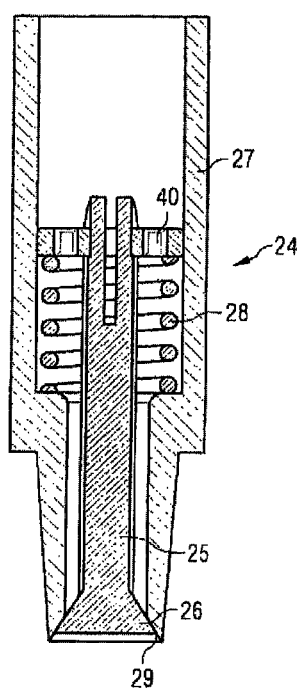
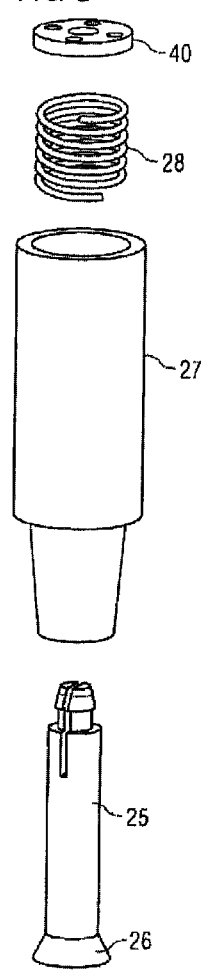

CAPSULE WITH FLOW REGULATING TECHNOLOGY

This application is a 371 filing of International Patent Application PCT/EP2008/53148 filed Mar. 17, 2008.

BACKGROUND

The present invention generally relates to the field of production of beverages or other liquid comestibles on the basis of ingredients contained in a capsule.

Such capsules are known for being inserted in matching beverage production machines (e.g. coffee machines). After being placed in an extraction chamber of the beverage production machine, water is injected into the capsule. The water will interact with the ingredients contained in the capsule. As a result of the interaction, a beverage or other comestible will be produced which can then be obtained from the capsule.

The invention preferably uses capsules which are hermetically sealed at a production site and which are inserted into the extraction chamber of the beverage production machine while still being in the sealed state. The capsule is opened both at the water inlet face for injection injecting pressurized water into the capsule as well as at the beverage outlet face for delivering the beverage. Openings on both sides may be produced by dedicated members of the machine. Note that these members can be driven manually, e.g. via a lever mechanism, or automatically by a motor.

EP 870 457 A1 and WO 94/02059 show extraction methods and extraction machines for essentially symmetrical capsules.

WO 94/01344 also describes a symmetrical capsule.

When water is injected into the interior of the capsule, especially when using ground coffee powder as an ingredient, it has to be assured that the water will be homogenously distributed all over the ingredients. A heterogeneous flow distribution of the water through the ingredients will lead to a poor quality or an unreliable quality of the produced beverage.

One known solution consists in having the water enter the interior of the capsule at a plurality of openings such that water distributes evenly across the whole transversal section of the capsule. However, this leads to a rather complex machine which has to be provided with a plurality of perforation/water injection members to this regard. Furthermore, the production of a plurality of openings requires a high closure force to be able to correctly pierce through the capsule for the injection of water. The required force is even higher for capsules containing ground ingredients in a compacted form.

Another issue, especially when extracting coffee from ground coffee powder containing capsule, is to control the flow rate of the usually pressurized hot water through the interior of the capsule. Depending on the kind of coffee to be produced, different flow rates and pressures inside the capsule have to be guaranteed. In particular, flow rates are usually relatively slow for capsules containing ground coffee in compacted form. Too slow of a flow rate may also negatively impact the extraction of coffee compounds.

Another issue is that when a "long" beverage (e.g., 110 mL or more) is desired, the solution usually consists in passing a higher amount of water through the ingredients. However, this may result in over-extracting the ingredients and to bitterness issues of the final drink.

SUMMARY OF THE INVENTION

The present invention now overcomes the disadvantages of the prior art by providing a technology for producing a beverage from an ingredient containing capsule with reliable quality, all by not increasing the complexity as well as the inconveniences associated with the existing beverage production machines.

One aspect in this regard is the homogenous distribution of the injected water throughout the bulk of the beverage ingredient. Another (independent) aspect is the reliable control of the flow rate and the pressure conditions inside the capsule.

This aspect is achieved by means of the features of the independent claims. The dependent claims develop further the preferred embodiments of the present invention.

According to a first aspect of the present invention a capsule comprising ingredients is proposed, wherein a rigid or flexible perforated flow regulating disc member is arranged inside the capsule, in particular in an enclosure of the capsule closed in a gas tight manner, thus separating the space for the ingredients into at least two parts. The disc member is arranged perpendicularly to the liquid flow path through the capsule, i.e. between the liquid inlet face and the liquid outlet face of the capsule.

The disc member can separate the ingredients space symmetrically or asymmetrically, such that correspondingly symmetrically partitioned compartments or asymmetrically partitioned compartments for the ingredients are produced.

The perforation of the disc member can be designed such that the flow resistance provided through the disc member is smaller at the periphery of the disc member than at its centre area.

In one mode, the number of perforation openings (i.e. the density of the perforation openings) and/or the cross-sectional surface of the perforation openings can be made larger at the periphery of the disc member than at its centre area. This configuration enables to distribute water, injected from the centre, more evenly through the whole cross section of the capsule.

It can be foreseen that the capsule can be selectively inserted in two different orientations in the beverage production machine, wherein in the first orientation the liquid will traverse the capsule in a first direction and wherein in the second orientation the liquid will traverse the capsule in a second direction which is opposite to the first direction. In this case the flow resistance as regulated by the disc member can be the same for both flow directions, or the flow resistance can be different between the first and second (opposite) flow direction. In the latter case the properties of the produced beverage can be set by choosing the corresponding orientation of the capsule in the beverage production machine.

The upper and/or lower side of the disc member can be provided with mechanical anchoring corrugations assisting in the stabilization of the ingredients in the capsule.

The disc member can be provided with the mechanical anchoring corrugations only near the centre area and be substantially free of corrugations near its free edge.

The disc member can extend radially to the rim of the capsule such that the ingredient space is completely partitioned by the disc member.

Alternatively, the outer rim of the disc member can be radially recessed from the rim of the capsule such that the ingredient space is not completely partitioned by the disc member.

According to another aspect of the present invention, a capsule containing ingredients for beverages or other liquid comestibles is proposed. Inside the capsule an insert is provided which has a plurality of tubular portions, such as e.g. two connected tubular portions. The tubular portions are respectively opened towards the associated front wall of the insert, such that the tubular portions are opened towards the neighbouring faces of the capsule. The insert is centrally arranged inside the capsule. The ingredients are entirely provided radially outside the tubular portions of the insert.

Preferably the capsule can be symmetrical with regard to a middle plane perpendicular to the length of the insert.

The tubular portions can be separated from each other by a closed partitioning wall between the two tubular portions such that there is no fluid communication between the two tubular portions.

Alternatively, at least one liquid duct can be provided in the partitioning wall of the tubular portions thus producing a liquid communication with reduced cross-section between the two tubular portions.

The insert can have a cylindrical wall defining the tubular portions and being provided with liquid passage means for producing a fluid communication between the inner hollow space of each tubular portion, i.e., the water injection space, and the space radially outside thereof, i.e. the ingredient space.

The passage means can be provided in the cylindrical wall of the insert closed to each front wall or directly at each ring-shaped front wall of the insert.

A rigid or flexible perforated disc member can be provided radially extending from the circumferential wall of the central insert.

The disc member can extend in a centre plane of the tubular portions.

The disc member (15) can be an integral piece with the tubular portions (6, 7) of the insert (2) or a separate piece thereto.

A still further aspect of the invention proposes a capsule comprising beverage ingredients. The capsule is provided with at least one inner bypass channel traversing the interior of the capsule designed to guide a portion of a liquid injected through a first face to an opening produced in an opposing second face of the capsule wall without said portion getting in contact with the ingredients.

The invention also relates to a capsule beverage device comprising
an enclosing member,
a water injection and perforation member having an outer tube member,
characterized that the outer tube member is selectively closed by an inner tube member and is openable by the fluid under pressure which moves the inner tube member in opening to let the fluid leave the water injection and perforation member and be injected in the capsule.

BRIEF DESCRIPTION OF THE DRAWINGS

Further advantages, features and object of the present invention will become evident for the skilled person when reading the enclosed detailed description of preferred embodiments of the invention, when taken in conjunction with the figures of the enclosed drawings.

FIGS. 2 and 3 show exploded views of a capsule according to two different embodiments of the present invention, essentially differing in the design of their insert.

FIGS. 4, 5 and 6 show details and the function of an embodiment of the capsule perforation and water injection member.

DETAILED DESCRIPTION OF THE INVENTION

Figure 1:
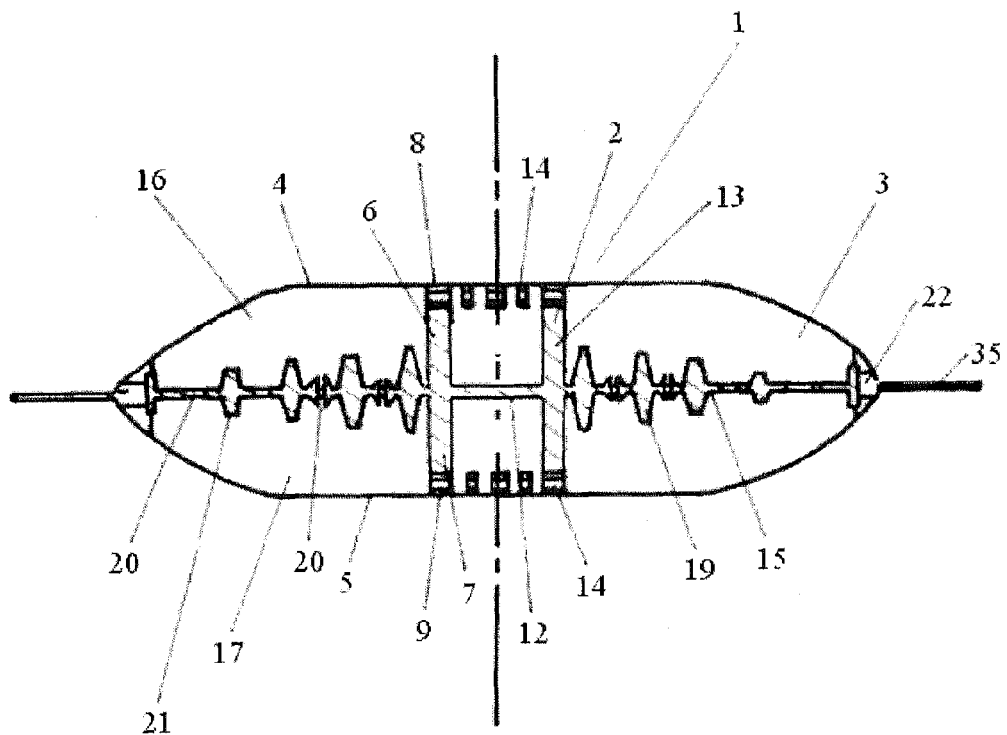
FIG. 1 shows a schematic cross-sectional view of a capsule according to the present invention.

In FIG. 1 a beverage ingredient containing capsule 1 is shown. The beverage ingredients are referenced by the numeral 3. These ingredients are preferably ground coffee powder, which preferably is present in the form of a compact and thus form-stable cake.

The capsule 1 shown in FIG. 1 has an essentially symmetrical design. Therefore, preferably such capsule 1 can be used with its first face 4 serving as the water injection side and its second face 5 serving as the beverage delivery side or vice versa. It can be noted that the capsule and the injection device are represented in the examples spatially in a top-down flow direction only as a matter of illustration, and the invention should also be imagined in any other possible spatial relationship (e.g., horizontal flow direction).

The two faces 4, 5 are connected to each other at a rim-shaped flange portion 35 and are preferably hermetically sealed to each other at this rim portion 35. Thus, the capsule 1, before being inserted in a beverage production machine and thus in the state as shown in FIG. 1, will contain the beverage ingredient 3 in a hermetically sealed and gas tight manner.

Inside the capsule 1 an insert 2 is provided. Preferably, this insert 2 is made from a rigid material, such as a plastic material, and is provided as one integral piece. Alternatively, this insert 2 can be composed of several parts. The insert 2 (or the parts from which it is composed) can be produced e.g. by injection moulding.

The insert 2 presents two tubular portions 6, 7 which are respectively open towards the neighbouring faces 4, 5, respectively, of the capsule 1 and which are separated from each other by a partitioning wall 12. In the example of FIG. 1 the partitioning wall 12 is closed and thus there is no direct liquid communication between the hollow spaces confined by the tubular portions 6, 7.

Note that the cross-section of the tubular portions 6, 7 does not necessarily have to be circular, but can present any other transversal section.

As will be explained later on, an adapted beverage production machine will have a perforation member perforating the face 4 within the area overlapping the tubular portion 6. Once such opening is made in the face 4, water can then be injected into the first tubular portion 6. The circumferential wall 13 of the insert 2 is provided with liquid passages 8 producing a fluid communication between the hollow space of the first tubular member 6 and the beverage ingredients 3 which are provided in a space radially surrounding the tubular portions 6, 7.

Preferably identically water passages 14 are also provided in the circumferential wall 13 of the second tubular member 7.

Preferably these water passages 14 are present in the area of the circumferential wall 13 of the tubular member 6, 7 close to the corresponding front wall 8 and 9 respectively, of the insert 2.

According to the embodiment of FIG. 1 these water passages are actually defined by projections and/or recessions (e.g. grooves) 14 in the front wall 8 and 9 respectively, of the insert 2.

From FIG. 1 it can be seen that the insert 2 is provided centrally in the interior of the capsule 1. The beverage ingredients 3 are entirely provided in an ingredient space 16, 17 radially outside the circumferential wall 13 of the insert 2.

Preferably, as shown in FIG. 1, the insert 2 extends throughout the entire thickness of the interior of the capsule 1 and thus essentially from the first face 4 to the second face 5.

Preferably, the insert 2 is provided inside the capsule 1 such that no ingredients can migrate from the ingredient spaces 16, 17 into the hollow spaces of the tubular portions 6 and 7, respectively.

A filter layer (not shown, but see references 43, 44 in FIG. 12) can also block the ingredients from migrating into the hollow spaces of the tubular portions 6, 7. The filter function can also be taken over by the passages 14 in case their cross-sections are made smaller than the average grain size of the ingredients.

Generally, water injected into the first tubular member 6 will exit the hollow space defined by the first tubular member 6 through the water passages 14 and will thus enter the ingredient space 16, 17. It will then traverse the ingredient space in an essentially axial direction.

The hot water will interact with the ingredients 3. The thus produced beverage or liquid comestible will then leave the capsule 1 at the lower face 5.

As can be seen from FIG. 1, the present invention generally also proposes the provision of an inner flow regulating member which, in the example of FIG. 1, is present as a perforated disc member 15. The disc member 15 can be solid or flexible (foil or membrane). If rigid, it can be made from a plastic material, e.g. by injection molding. The disc member 15 can be an integral piece of the insert 2 or a separate piece.

The disc member 15 is arranged perpendicularly to the liquid flow path through the capsule, i.e. between the liquid inlet face 4 and the liquid outlet face 5 of the capsule 1.

In the example of FIG. 1 the perforated disc member 15 extends from the insert 2 in the centre plane of the insert 2, i.e. a plane perpendicular to the axis of the tubular portions 6, 7 and crossing the insert 2 and the level of the partitioning wall 12 of the insert 2.

The disc member can also be arranged at other levels of the insert in which case asymmetrically partitioned ingredient compartments will be produced.

A plurality of disc members can be provided at different levels in order to produce more than two ingredient compartments, which can be of advantage e.g. in case different ingredients are to be contained in the interior of the capsule.

The invention also covers embodiments which only have the disc member 15, but not the insert 2 of FIG. 1 having two connecting tubular portions 6, 7. (Such embodiments will be described later on with reference to FIGS. 11 and 12.)

In any case, the perforated disc-shaped member 15 is provided inside the capsule 1 such that it separates the ingredient space completely or partially (see FIG. 2) into two ingredients compartments 16, 17.

The disc-shaped member 15 is perforated with openings 20 in order to produce a liquid communication channel between the first and the second compartment 16, 17 of the ingredient space.

Optionally, the disc-shaped member can serve as a flow-regulating member such that the pressure conditions inside the capsule 1 can be controlled by the flow resistance of the perforation openings 20 of the disc member 15, the disc member 15 essentially representing the bottle-neck of the liquid flow through the interior of the capsule 1.

The two ingredient space compartments 16, 17 can contain the same or different ingredients. Thus, the openings 20 can also have the function of a filter avoiding the migration from ingredients of the first ingredient compartment 16 into the second compartment 17 and vice versa.

The flow resistance of the disc-shaped member 15 can be constant over the entire surface of the disc-shaped member 15. Alternatively, the flow resistance of the disc shaped member 15 can decrease towards the periphery 18 of the disc member such that the flow resistance of the disc member 15 is smaller at the periphery than at the centre. The effect is that water tends to spread more evenly across all the transverse section of the first portion of ingredients and up to the edge of the capsule thus ensuring that all the coffee contained in the capsule is fully extracted.

Therefore, the disc-shaped member 15 has a water-distributing function ensuring that any water coming from the central insert 2 is homogeneously spread all over the width of the capsule 1.

This can be achieved e.g. by having a higher density of perforation openings 20 and/or openings with a higher cross-sectional surface at the periphery 18 when compared to the centre area 19.

The upper and/or lower side of the disc-shaped member 15 can be provided with corrugations 21.

Although the disc-shaped member 15 in FIG. 1 is shown in a symmetrical arrangement (thus producing symmetrical beverage ingredient compartments 16, 17), it is to be understood that the disc-shaped member 15 can also be provided asymmetrically, thus producing different beverage ingredient compartments 16, 17.

In the embodiment of FIG. 1 (and also FIG. 3) the disc-shaped member 15 extents throughout the entire width of the interior of the capsule 1 and thus entirely divides the two beverage ingredient compartments 16, 17.

In the embodiment of FIG. 2, the cross-section of the disc-shaped member 15 is smaller than the cross-section of the interior of the capsule 1 and the width direction, such that the outer rim of the disc-shaped member 15 will be radially recessed from the flange area 35 of the capsule 1.

As can be seen from FIG. 2, the corrugations 19 can e.g. be pyramids distributed over the lower and/or upper side of the disc-shaped member 15 in a regular pattern. Of course, the corrugations can take other shapes such as cubic, cross or polygonal contours.

In FIG. 2 one can also see that the ingredients 3 can be provided as two halves of a solid compacted cake.

FIG. 3 shows a perspective exploded view of the capsule of FIG. 1.

In this example, on the one hand the disc-shaped member 15 extents throughout the entire width direction of the interior of the capsule 1. In addition, the corrugations 19 are only provided at the centre area 19 of the disc member but not at the periphery 18 thereof.

Figure 6:
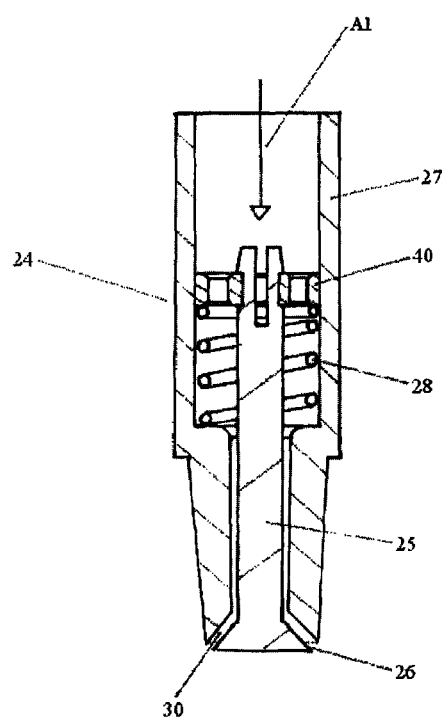

FIGS. 4 to 6 show a capsule perforation and water injection member 24 which can be used together with the capsule as shown in FIGS. 1 to 3. The perforation and injection member essentially comprises an outer tube member 27 and an inner member 25 having a conical seat portion 26. The conical seat portion 26 tightly closes off the front and outer tube portion 27 assisted by the biasing force of spring means 28.

The front wall 29 of the outer tube 27 is designed as a relatively sharp edge which (see explanations later on) will guarantee a correct perforation of the capsule face 4 in the area of the capsule face 4 overlapping the hollow space of the first tubular member 6.

One advantage of the perforation and water injection member 24 is that its tip closes as soon as the water flow is stopped, thus avoiding beverage, liquid or solid residue from contaminating the inner surface of the injection member. It is particularly advantageous in the context of the capsule where the injection member is deeply inserted in the tubular portion 6 of the insert.

As can be seen from FIG. 4, without water pressure being applied the conical seat portion 26 tightly closes off the water exit of the outer tube 27.

It has to be noted that the sharp edge portion 29 of the outer tubes 27 axially extents slightly beyond the edge of the conical seat member 26. Thus, the cutting effect of the sharp edge 29 will not be hindered by the bottom surface of the conical seat portion 26.

FIG. 6 shows the water injection and perforation member 24 in a state where water pressure is applied as indicated by an arrow A1.

The water pressure acts on an inner disc 40 which is mounted to the inner member 25. The inner tubular member 25 is assembled to the inner disc 40 in the outer tubular member by clipping. The water pressure will thus move the inner member 25 against the biasing force of the spring element 28, such that the conical valve seat portions 26 will also move downwards and will thus produce an annular gap 30 between the edge 29 of the outer tube 27 and the conical seat portion 26. Thus, water can be injected into a capsule.

It is to be noted that the water pressure is only applied after the water injection and capsule perforation member 24 has been made to penetrate into the hollow space defined by the first tubular member 6. Only after the sharp edge 29 has produced a hole in first face 4 of the capsule and the water injection perforation member 24 penetrates into the hollow space defined by the first tubular member 6 (see FIG. 7), the water pressure will be applied which will move downwards the inner member 25 and open the annular gap 30.

Figure 7:
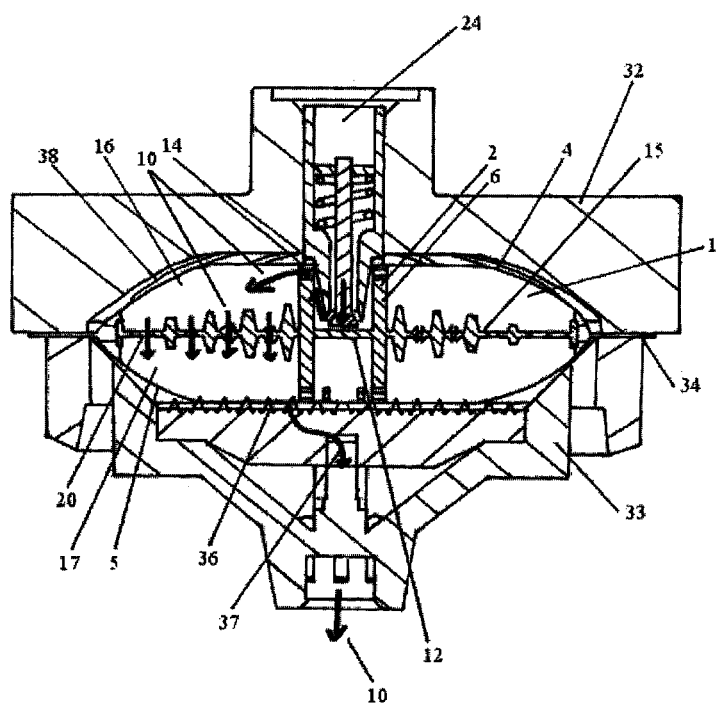
FIG. 7 shows a schematic view of a capsule according to an embodiment of the present invention when inserted in an extraction chamber of a beverage production machine as well as the liquid flow path occurring when operating the beverage production machine.

FIG. 7 shows a capsule 1 according to the present invention when inserted into the extraction chamber of a beverage production machine. The extraction chamber is defined between an enclosing upper member 32 and a capsule support 33.

The enclosing member 32 and the capsule support 33 join each other at sealing surfaces 34 which can be designed to clamp the flange 35 of the capsule 1 in a water tight and pressure tight manner.

The capsule support 33 can be provided with a profiled plate 36, which assists in the opening of the lower face 5 of the capsule 1. When the water pressure builds up in the interior of the capsule 1, the lower face 4 will be deformed against the profile 36 until the lower face 35 reaches its strength and perforations are produced in the lower face 5. Note that a plurality or only a single outlet opening can be produced in such a manner depending on the specific design of the profiled plate 36.

In any case, a beverage from the interior of the capsule 1 can leave the beverage production machine through an outlet channel 37.

FIG. 7 shows the water injection and perforation member 24 in a state in which an opening has been produced in the first face 4 of the capsule and the water injection and perforation member 24 penetrates into the hollow space defined by the tubular member 6. Dark arrows (some of which are identified as 10) demonstrate the fluid path of the injected water through the capsule. Water injected through the annular gap 30 of the water injector will leave the hollow space defined by the tubular member 6 through the passages 14 provided in the wall of the insert 2 defining the hollow space.

The water will interact with ingredients in the first compartment 16, will then go through the openings 20 of the disc-shaped member 15, will interact with the beverage ingredients in the second compartment 17 and a produced beverage will finally leave the beverage production machine through the outlet opening 37.

As shown in FIG. 7, the water injection can take place close to the bottom wall 12 of the tubular member 6 such that the water jet will be deflected first towards the front wall 8 of the insert 2 in order to leave the hollow space of the tubular member 6 through the passages 14.

Figure 8:
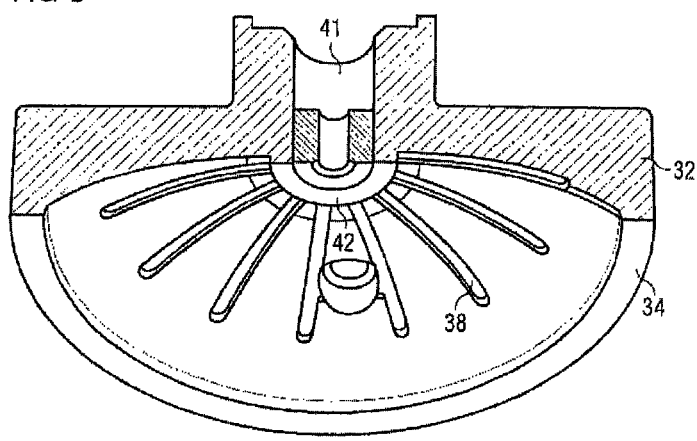
FIG. 8 shows a perspective view of the inner side of an enclosing member of the beverage production machine of FIG. 7.

FIG. 8 shows an example for the enclosing member 32. The enclosing member 32 has a central opening 41 for housing the water injection and perforation member 24.

The dome-shaped inner side of the enclosing member 32 can be profiled and can e.g. be provided with channels 38 that extend radially from opening 41.

In FIG. 8 the outer sealing surface 34 of the enclosing member 32 can also be seen.

The capsule support 33 is provided with a matching surface.

Due to the channels 38 in the inner side of the dome of the enclosing member 32, the capsule 1, i.e. its top face 4 will be dynamically profiled upon pressurizing the interior of the capsule 1 by the injection of water. The channels 39 will then have complementary shapes to any corrugation of the inner side of the dome of the enclosing member 32.

The dynamically formed channels in the face 4 of the capsule 1 provide a radial distribution of the injected water at the surface of the ingredient and through substantially the entire cross section of the capsule. The inner ends 42 of the dynamically profiled channels 39 are close to the passages 14 and the insert 2.

Figure 10:
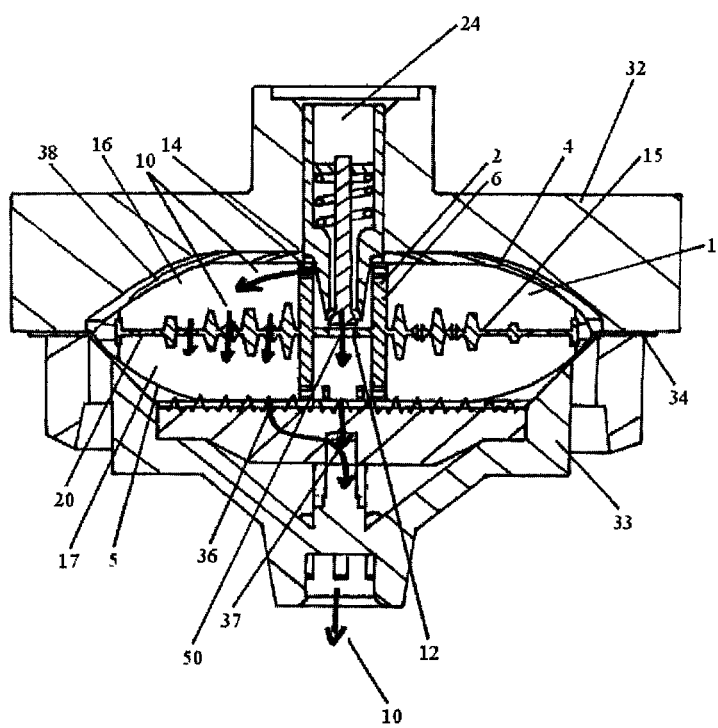
FIG. 10 shows a view comparable to FIG. 7, however, with a capsule according to a still further embodiment of the present invention.

FIG. 10 shows an embodiment of the present invention in which, contrary to the embodiment of FIGS. 1 and 7, fluid communication, e.g. a duct 38 is provided between the first tubular member and the second tubular member 7 of the insert 2. As in FIG. 7, dark arrows (some of which are identified as 10) demonstrate the fluid path of the injected water through the capsule. As such, a portion of the injected water will bypass the ingredients and will directly, e.g. without interaction with the ingredients arrive at the outlet channel 37, where pure water will be mixed with the beverage produced by the interaction of the portion of the water which has been made to interact with the ingredients. Such a capsule 1 having means for guiding injected water to the outlet without interaction with the ingredients is adapted e.g. for the production of so-called "lungo style" coffee or for any other beverage where the produced beverage is to be diluted with pure hot water.

Generally the duct 38 together with the tubular portions 6, 7 represents just one example for an inner bypass channel in a capsule. The number and surface of the duct can be adjusted as a function of the desired ratio extracted liquid volume:bypassed liquid volume. The bypass channel traverses the interior of the capsule and is designed to guide a portion of a liquid flow injected through a first face to an opening produced in an opposing second face of the capsule wall without said liquid low portion getting in contact with the ingredients.

Another portion of the liquid flow will be caused to interact with the ingredients before arriving at the outlet face 5.

It has been shown that the capsule system according to the present invention promotes a high quality and a high reliability of the extraction (interaction) process of the water with the ingredients.

Although, the above explanation has been made based on a symmetrical arrangement of the capsule, the capsule can be designed and the ingredients can be selected such that the extraction process depends on the flow direction of the water, i.e. whether water is injected in the tubular member 6 or the tubular member 7.

As it is also shown in FIGS. 7 and 10 and particularly in FIG. 8, the enclosing member 42 is also provided with an inner sealing surface 42 which (see FIGS. 7 and 10) is pressed against the top surface 8 of the insert 2, the top face 4 being sandwiched between the sealing surface 42 and the front wall 8 of the insert 2. This will lead to a sealing of the capsule system in an annular area surrounding the water injection and perforation member 24. Thus, water injected into the hollow space of the tubular member 6 can only exit from the hollow space through the passages 14, but not through a leak outside the capsule.

It is to be noted that the reinforcement effect of the insert 2 promotes this sealing arrangement between the sealing surface 42 of the enclosing member 32 as the reinforcing insert 2 procures a counterforce for the sealing.

A further advantage of the invention is that the characteristics of the produced beverage can be varied from capsule to capsule by varying the flow characteristics of the disc member 15. Even when using the same capsule, the characteristics of the produced beverage can be varied by reversing the insertion side of the capsule submitted to extraction, if the flow characteristics of the insert 2 and/or the disc-shaped member 15 are not symmetrical.

The invention can use a simple extraction chamber with a centralised injecting member 24.

The flow characteristics of the capsule depends on the insertion direction of the capsule (and thus the direction of the water flow through the interior of the capsule) if the flow regulating disc member 15 is not arranged symmetrically, but offset the median transversal plane (centre plane).

The corrugations 20 of the disc-shaped member 15 do also have an effect in stabilising the neighbouring bulk of beverage ingredients.

Figure 11:
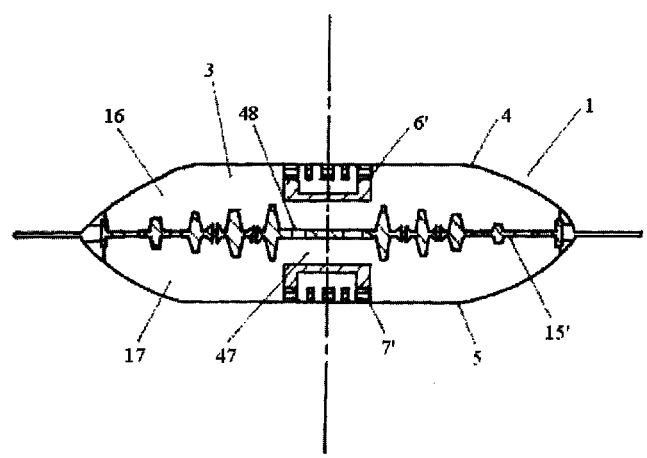
FIG. 11 shows a schematic cross-sectional view of a capsule according to another possible embodiment of the present invention.
Figure 12:
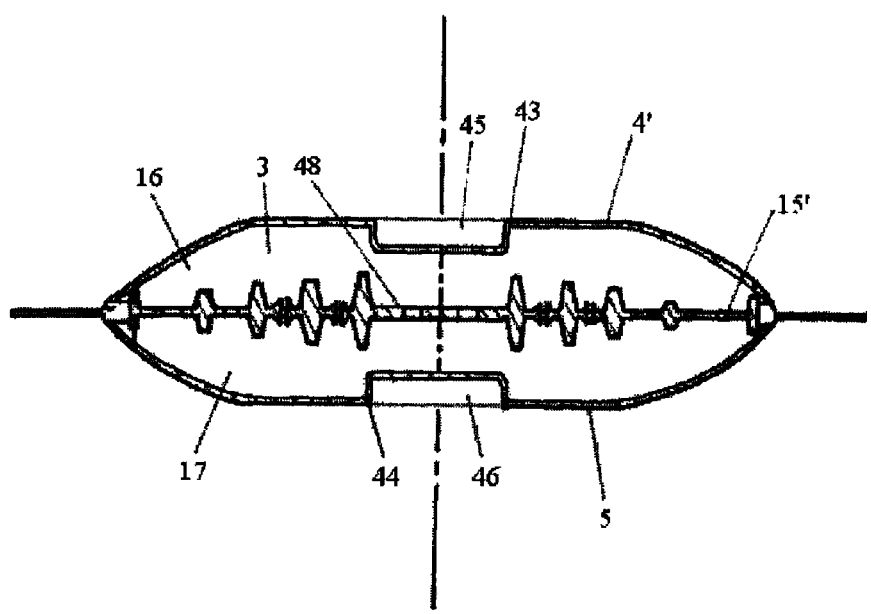
FIG. 12 shows a schematic cross-sectional view of a capsule according to still another possible embodiment of the present invention.

The embodiments of FIGS. 11 and 12 show capsules 1 having respectively a disc-shaped member 15' entirely traversing the capsule in the width direction and not being connected nor being integral to any other parts inserted in the interior of the capsule 1.

In FIG. 11 unconnected "tubular portions" 6', 7' are shown which actually are symmetrically arranged flow-diverting inserts. Note that the invention also encompasses embodiments having only one of the inserts 6', 7'.

Contrary to the embodiment of FIG. 1 a portion 47 of each ingredient compartment 16, 17 of the ingredient space is sandwiched between the inserts 6', 7'. Thus the ingredients are not entirely arranged radially outside the inserts 6', 7'.

Each space of ingredients separated by the disc member can be of same or different nature. For instance, one space of ingredients can contain coffee of a granulometry and/or blend which differs from the other space. As a result, the characteristic of the coffee can be different upon which surface 4, 5 of the capsule serves as the injection surface and which surface 4, 5 serves as the beverage delivery surface.

The flow-regulating disc 15' can also have perforation openings 48 in its centre area.

Figure 9:
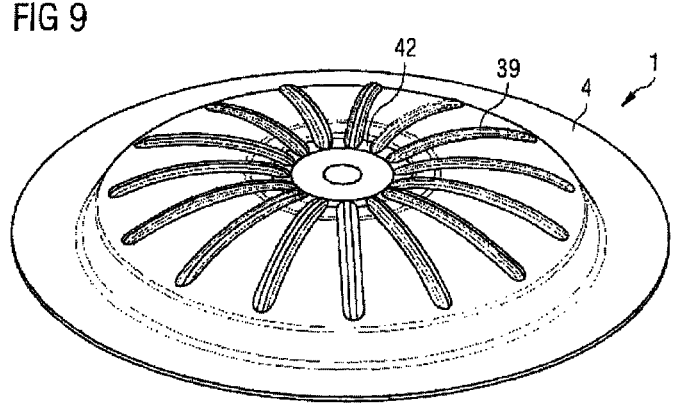
FIG. 9 shows a view of a top face of the beverage ingredient containing capsule according to an embodiment of the present invention after an extraction process.

In the embodiment of FIG. 12 the capsule 1 does not have such inserts 6', 7'. A flexible or rigid filtering layer 43, 44, respectively, is arranged close to each of the faces 4, from which the wall of the capsule 1 is composed. The filtering layers 43, 44 are formed with central depressions 45, 46, respectively. Water can then be injected e.g. in the depression 45, which water will then pass the filtering layer 43 after having been radially distributed in the space between the filtering layer and the adjacent face of the capsule 1 (e.g. assisted by the dynamically formed channels shown in and explained with reference to FIGS. 8 and 9).

Note that such filtering layers 43, 44 can also be used in connection with all other embodiments (in the embodiment FIG. 1 the filtering layers will then have a central opening through which the tubular portions 6, 7 protrude).

What is claimed is:

1. A capsule comprising beverage ingredients therein, wherein the capsule comprises:
   a closed enclosure hermetically sealed to gas;
   inner bypass channel traversing the interior of the capsule for guiding a portion of an injected liquid through a first wall of the capsule to an opening produced in an opposing second wall of the capsule without contacting the beverage ingredients; and
   a perforated flow-regulating disc member which is arranged in the closed enclosure, perpendicularly to a path of liquid flow inside the capsule, and which is configured for separating the ingredients at least partially into at least two ingredient spaces and which enables liquid to spread more evenly and transversely across one ingredient space and to the periphery of the enclosure to facilitate extraction of the beverage ingredients in the ingredient spaces.

2. The capsule according to claim 1, wherein the disc member is positioned to separate the ingredient spaces symmetrically or asymmetrically and wherein the disc member is positioned to partition the ingredients spaces in a manner such that the ingredient spaces are distributed in series relative to the liquid flow path.

3. The capsule according to claim 1, wherein the disc has a number of perforation openings, wherein the number of openings or their cross-section is larger at the periphery of the disc member than at its center area so that flow resistance of the disc member is smaller at the periphery of the disc member than at its center area.

4. The capsule according to claim 1, wherein the flow-resistance of the disc member differs between a first flow direction and a second, reversed flow direction across the disc member to further facilitate extraction of the beverage ingredients.

5. The capsule according to claim 1, wherein the flow-resistance of the disc member is independent of the flow direction across the disc member.

6. The capsule according to claim 1, wherein the beverage ingredients are present in compact form.

7. A capsule comprising beverage ingredients therein, wherein the capsule comprises:
   a closed enclosure hermetically sealed to gas;
   a perforated flow-regulating disc member which is arranged in the closed enclosure, perpendicularly to a path of liquid flow inside the capsule, and which is configured for separating the ingredients at least partially into at least two ingredient spaces and which enables liquid to spread more evenly and transversely across one ingredient space and to the periphery of the enclosure to facilitate extraction of the beverage ingredients in the ingredient spaces; and an insert located within the enclosure and having two tubular portions which are respectively open away from the center of the enclosure;

wherein the insert is centrally arranged inside the capsule, and the ingredients are entirely provided radially outside the tubular portions of the insert and further wherein the capsule is symmetrical with regard to a middle plane perpendicular to the length of insert and the tubular portions, respectively, the plane having a closed bottom and acting as a partition wall between the two tubular portions such that there is no fluid communication between the two tubular portions.

8. The capsule according to claim 7, wherein the cylindrical wall of the insert is provided with openings for providing fluid communication between each tubular portion and the spaces radially outside the insert where the ingredients are provided; wherein the openings are arranged such that liquid can flow into an upper part of the ingredient space.

9. The capsule according to claim 7, wherein the disc member comprises a perforated rigid or flexible member that extends radially from the circumferential wall of the insert in a central plane of the tubular portions and is an integral piece with the tubular portions.

10. A capsule based beverage production device comprising:

an enclosing member containing beverage ingredients therein;

a water injection and perforation member having an outer tube member having a flared portion that is selectively closable by an inner tube member and selectively openable by injection of a fluid under pressure which moves the inner tube member in an opening to allow the fluid to leave the water injection and perforation member and be injected in the capsule;

wherein the inner tubular member comprises a conical seat portion that closes the flared portion of the outer tube member.

11. The device according to claim 10, wherein the inner tube member is moved in a linear axial direction against the resistance of an elastic member to open a gap between the outer tube member and the inner tube member.

12. The device according to claim 11, wherein the gap is annular.

13. The device according to claim 10, wherein the outer tube terminates in a sharp outer edge for penetrating the enclosure to facilitate injection of a fluid into the beverage ingredients.

14. The device according to claim 13, wherein the sharp outer edge extends beyond the conical seat portion.

15. The device according to claim 10, wherein the inner tubular member is assembled to an inner disc housed in the outer tubular member by clipping.

* * * * *

UNITED STATES PATENT AND TRADEMARK OFFICE
CERTIFICATE OF CORRECTION

PATENT NO.       : 8,424,447 B2                                              Page 1 of 1
APPLICATION NO. : 12/532114
DATED            : April 23, 2013
INVENTOR(S)      : Colantonio et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this
Eighth Day of September, 2015

Michelle K. Lee
*Director of the United States Patent and Trademark Office*